(12) United States Patent
Qualls

(10) Patent No.: US 7,094,014 B1
(45) Date of Patent: Aug. 22, 2006

(54) AIR-OPERATED DEVICE FOR SECURING CARGO ONTO A VEHICLE

(76) Inventor: William Qualls, 7765 Jersey Rd., Salisbury, MD (US) 21801

( * ) Notice: Subject to any disclaimer, the term of this patent is extended or adjusted under 35 U.S.C. 154(b) by 0 days.

(21) Appl. No.: 11/205,437

(22) Filed: Aug. 18, 2005

(51) Int. Cl.
*B61D 45/00* (2006.01)

(52) U.S. Cl. ..................................... 410/100

(58) Field of Classification Search ............... 410/100, 410/103–105; 24/265 CD, 115 K; 248/499
See application file for complete search history.

(56) References Cited

U.S. PATENT DOCUMENTS

| | | | |
|---|---|---|---|
| 2,738,204 A * | 3/1956 | Ibey | 410/36 |
| 2,768,004 A * | 10/1956 | Wagner | 410/100 |
| 2,773,700 A * | 12/1956 | Lasswell | 410/36 |
| 3,240,473 A * | 3/1966 | Coffey et al. | 410/103 |
| 3,697,045 A * | 10/1972 | Farley | 410/103 |
| 4,036,476 A | 7/1977 | Douce et al. | |
| 4,247,235 A | 1/1981 | Sunesson | |
| 4,382,736 A * | 5/1983 | Thomas | 410/104 |
| 4,606,096 A | 8/1986 | Wood et al. | |
| 4,884,928 A * | 12/1989 | Nachtigall et al. | 410/103 |
| 5,118,232 A * | 6/1992 | Shuker | 410/98 |
| 5,234,298 A * | 8/1993 | Shuker | 410/98 |
| 5,288,187 A | 2/1994 | Ward | |
| 5,295,664 A | 3/1994 | Kamper | |
| 5,441,371 A * | 8/1995 | Erke | 410/100 |
| D373,942 S | 9/1996 | Sears | |
| 6,626,621 B1 * | 9/2003 | Hugg | 410/103 |

* cited by examiner

*Primary Examiner*—H Gutman

(57) ABSTRACT

An adjustable latching device for tying down a load includes a plurality of elongated rails provided with a slot extending along a length thereof and an elongated and flexible fastening member extendable along a top portion of the load. The device further includes a mechanism for selectively tightening the fastening member so that an operator may adjust a tension of the fastening member from a remote location. An elongated and rigid bar is connected to the tightening mechanism for assisting in maintaining the fastening member at a stable position. Such a fastening member has opposed end portions operably connected to the tightening mechanism and removably attachable to an opposed side of the truck respectively.

12 Claims, 4 Drawing Sheets

AIR-OPERATED DEVICE FOR SECURING CARGO ONTO A VEHICLE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a securing device and, more particularly, to a pneumatically operated device for securing cargo onto a vehicle.

2. Prior Art

Heavy-duty cargo tie-down systems, well known in the prior art, utilize chains as the tension members. Cargo tie-downs of the chain type must use tensioners which are easily operated by inexperienced personnel, must be capable of easily tensioning the chain after the chain has been connected to the tensioner, and the chain must be easily released from the tensioner.

As chain-type cargo tie-down systems are of a non-elastic character in that the chain does not expand or elongate under tension, the chains of the system must be properly tensioned, and maintain the desired tension, if impacts and jarring are to be avoided due to a tendency for the cargo to shift. Previously, available chain tensioners for tie-down systems have not had the ability to effectively cushion impacts arising from high tension forces imposed upon the tensioner.

Many chain tensioners for cargo tie-down systems are not capable of cushioning impact forces and absorbing high tension impact forces which may damage or render inoperable the known chain tensioners. Such impacts may also result in the shifting, loosening or dislodging of the materials being tied down, which can cause a hazard on the road if they fall off of the surface they are being transported on.

Accordingly, a need remains for an air-operated device for securing cargo onto a vehicle in order to overcome the above-noted shortcomings. The present invention satisfies such a need by providing an air device that is easy to use, convenient and efficient in its purpose, and improves the safety of road travel with a tied down load. Such an air device enables the tensioners to be tightened to a level that shifting and loosening of the transported loads are prevented. Advantageously, the air device will further prevent serious highway accidents, and the resulting vehicular damage, higher insurance costs, and injuries.

BRIEF SUMMARY OF THE INVENTION

In view of the foregoing background, it is therefore an object of the present invention to provide an air-operated device for securing cargo onto a vehicle. These and other objects, features, and advantages of the invention are provided by an adjustable latching device for tying down a load carried on a flatbed truck.

The device includes a plurality of elongated rails securable to selected portions of the truck. Such rails are aligned along a substantially horizontal plane and extend parallel to each other. Each of the rails is provided with a slot extending along a length thereof.

An elongated and flexible fastening member is extendable along a top portion of the load for traversing and laterally spanning across a width of the truck so that the load can advantageously be maintained at a substantially stable position during operating conditions. Such a fastening member preferably includes a linked chain provided with a hook attached thereto so that an operator can advantageously readily secure the chain to a rail of the truck.

A mechanism is included for selectively tightening the fastening member such that an operator may conveniently adjust a tension of the fastening member from a remote location. The tightening mechanism preferably includes a control panel electrically coupled to the tightening mechanism. Such a control panel includes a user interface having a plurality of buttons for effectively toggling the device between selected operating modes.

The tightening mechanism further includes an air cylinder that has a piston adaptable between retracted and extended positions. Such a cylinder includes a pair of conduits operably connected thereto and to an air supply source for selectively channeling air having a predetermined pressure level to and from the cylinder respectively. The cylinder is slidably attachable to one of the rails and movable therealong. The conduits are provided with a pair of quick-disconnect couplings for allowing an operator to retrofit the device to alternate air supply sources.

The tightening mechanism also includes a bracket slidably attachable to another one of the rails and positionable laterally of the one rail adjacent to a bed of the truck. A spool having opposed end portions is connected to the bracket and aligned along the horizontal plane. A gear is operably attached to one of the spool end portions and a sprocket is operably attached to another one of the spool end portions. The gear and the sprocket are axially rotatable about the spool along a selected direction and in sync. The fastening member is operably connected to the sprocket and has a tension that can be selectively adjusted as the air cylinder is adapted between extended and retracted positions.

An elongated and rigid bar is connected to the tightening mechanism for advantageously assisting to maintain the fastening member at a stable position. Such a fastening member has opposed end portions operably connected to the tightening mechanism and removably attachable to an opposed side of the truck respectively.

The gear preferably includes an outer surface that has a plurality of teeth offset therefrom and extending along a selected radial path and a locking tab pivotally connected to the bracket for selectively engaging the teeth as the gear rotates about a first direction. Such a locking tab generates a resistive force for advantageously preventing the gear from rotating along a second direction so that the fastening member can be maintained at the selected tension during operating conditions.

The gear may further include a hand-operable tightening member. Such a gear has a plurality of intersecting bores formed therein for receiving the tightening member so that an operator can advantageously manually adjust the tension without requiring the employment of the air cylinder.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
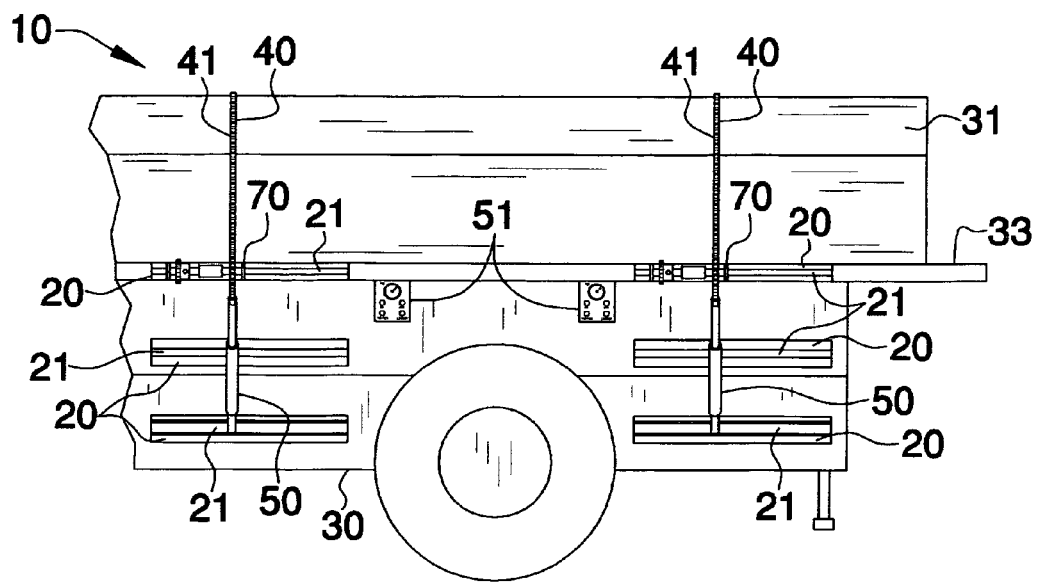
FIG. 1 is a side elevational view showing an air-operated device for securing cargo onto a vehicle, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1–6 by the reference numeral 10 and is intended to provide an air-operated device for securing cargo onto a vehicle. It should be understood that the device 10 may be used to secure many different types of cargo and should not be limited to only cargo stored on flatbed trucks.

Referring initially to FIG. 1, the device 10 includes a plurality of elongated rails 20 securable to selected portions of the truck 30. Such rails 20 are aligned along a substantially horizontal plane and extend parallel to each other. Each of the rails 20 is provided with a slot 21 extending along a length thereof.

Figure 2:
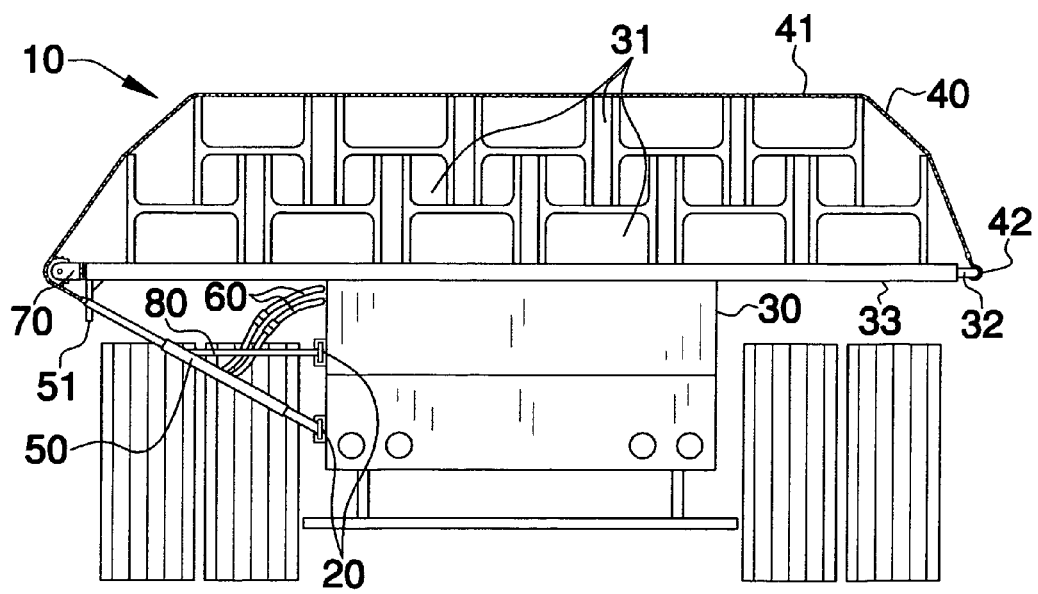
FIG. 2 is a rear elevational view of the device shown in FIG. 1.
Figure 6:
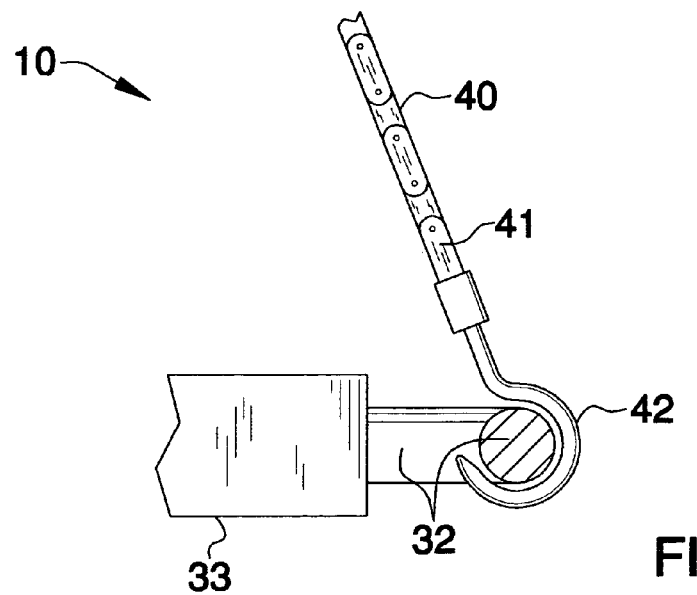
FIG. 6 is an enlarged side elevational view of a fastening member with the hook attached thereto.

Referring to FIGS. 1 and 2, an elongated and flexible fastening member 40 is extendable along a top portion of the load 31 for traversing and laterally spanning across a width of the truck 30 so that the load 31 can advantageously be maintained at a substantially stable position during operating conditions. Such a fastening member 40 has opposed end portions operably connected to the tightening mechanism 50 and removably attachable to an opposed side of the truck 30 respectively. The fastening member 40 further includes a linked chain 41 provided with a hook 42 attached thereto so that an operator can advantageously readily secure the chain 41 to a rail 32 of the truck 30, as best shown in FIG. 6. The inherent strength of the chain 41 ensures that the fastening member 40 will not break under the stress of the tension applied thereto, thus allowing it to maintain the load 31 at a stable position.

Figure 3:
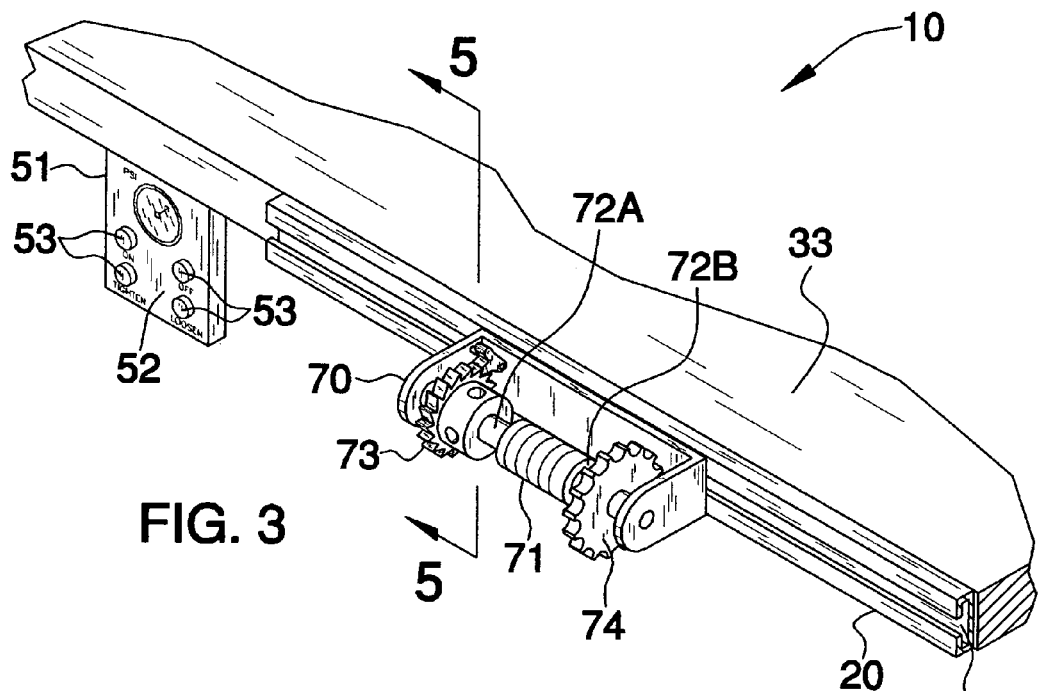
FIG. 3 is an enlarged perspective view of the device shown in FIG. 1.
Figure 4:
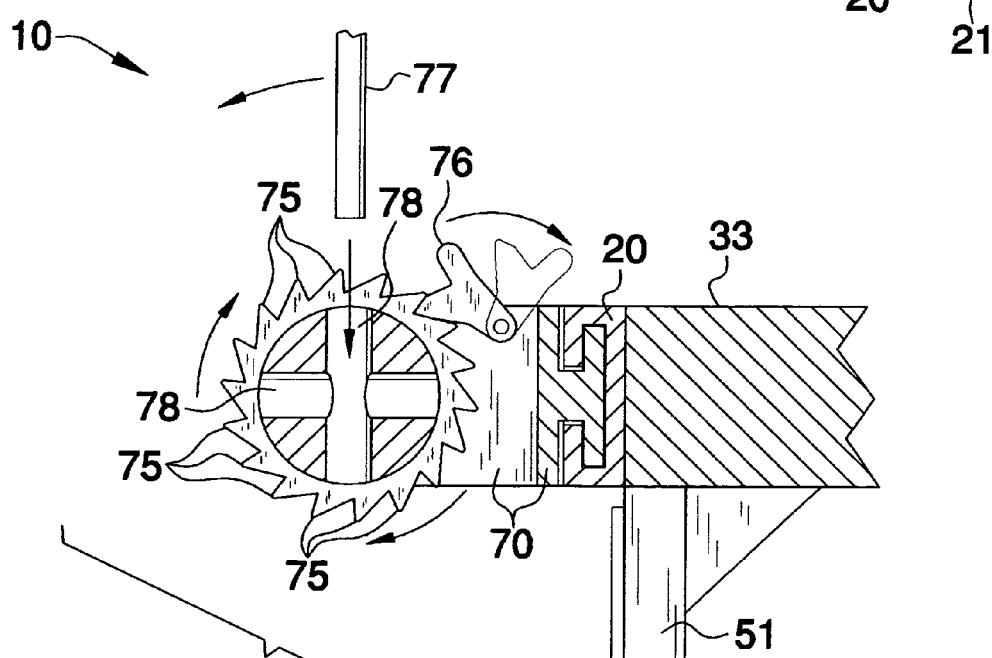
FIG. 4 is an enlarged cross-sectional view of the device shown in FIG. 3, taken along line 4—4.

Referring to FIGS. 3 and 4, a mechanism 50 is included for selectively tightening the fastening member 40 so that an operator may conveniently adjust a tension of the fastening member 40 from a remote location. This feature conveniently allows the operator to adjust the tightening mechanism 50 without using manual force, thus saving the operator's time and energy. The tightening mechanism 50 includes a control panel 51 electrically coupled to the tightening mechanism 50. Such a control panel 51 includes a user interface 52 having a plurality of buttons 53 for effectively toggling the device 10 between selected operating modes.

Figure 5:
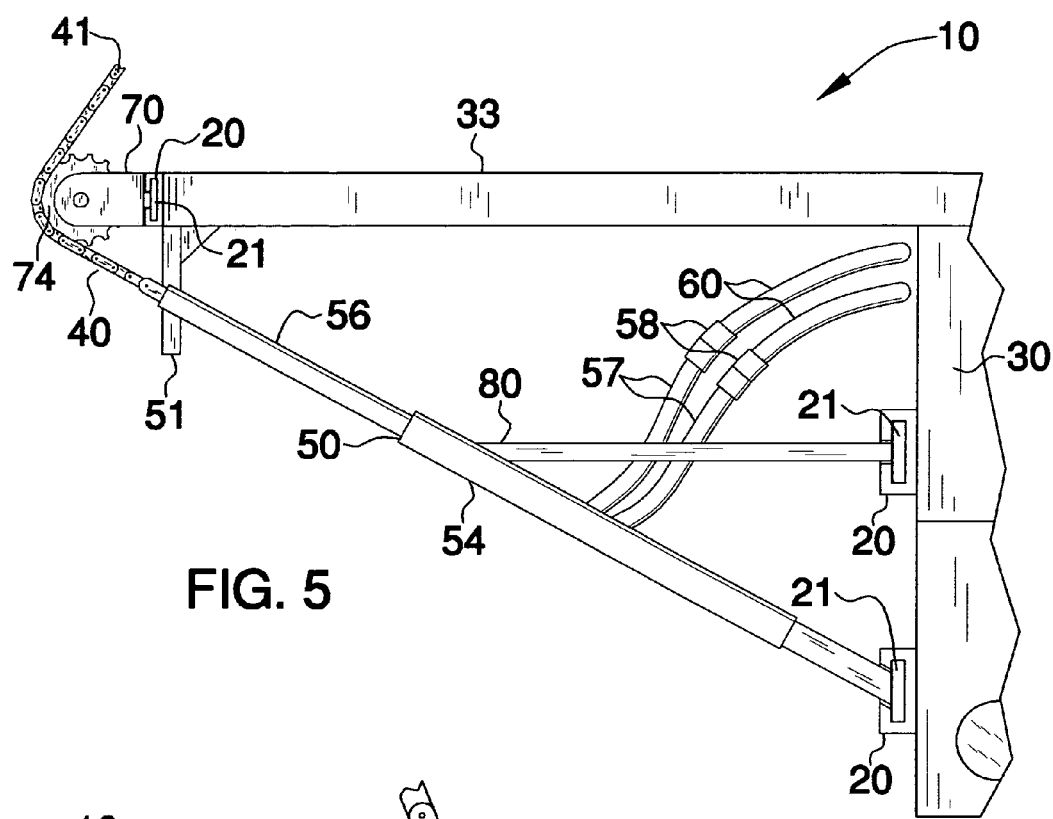
FIG. 5 is an enlarged side elevational view of the device shown in FIG. 1

Referring to FIGS. 2 and 5, the tightening mechanism 50 further includes an air cylinder 54 that has a piston 56 adaptable between retracted and extended positions. Such a cylinder 56 includes a pair of conduits 57 operably connected thereto and to an air supply source 60 for selectively channeling air having a predetermined pressure level to and from the cylinder 54 respectively. The continuous air supply source 60 advantageously ensures that the fastening members 40 are always at the optimum level of tension to keep the load 31 stable during operating procedures. The cylinder 54 is slidably attachable to one of the rails 20 and movable therealong. This feature advantageously allows the tension to be applied to those areas that need it most for optimum stability of the load 31. The conduits 57 are provided with a pair of quick-disconnect couplings 58 for allowing an operator to retrofit the device 10 to alternate air supply sources 60. This feature conveniently increases the conditions under which the device 10 can function.

Referring to FIGS. 3, 4 and 5, the tightening mechanism 50 also includes a bracket 70 slidably attachable to another one of the rails 21 and positionable laterally of the one rail 21 adjacent to a bed 33 of the truck 30. A spool 71 having opposed end portions 72A and 72B is connected to the bracket 70 and aligned along the horizontal plane. A gear 73 is operably attached to one of the spool end portions 72A and a sprocket 74 is operably attached to another one of the spool end portions 72B. The gear 73 and the sprocket 74 are axially rotatable about the spool 71 along a selected direction and in sync. The fastening member 40 is operably connected to the sprocket 74 and has a tension that can be selectively adjusted as the air cylinder 54 is adapted between extended and retracted positions. An elongated and rigid bar 80 is connected to the tightening mechanism 50 for advantageously assisting to maintain the fastening member 40 at a stable position, as best shown in FIGS. 2 and 5.

Referring to FIGS. 3 and 4, the gear 73 includes an outer surface that has a plurality of teeth 75 offset therefrom and extending along a selected radial path. A locking tab 76 is pivotally connected to the bracket 70 for selectively engaging the teeth 75 as the gear 73 rotates about a first direction. Such a locking tab 76 generates a resistive force for advantageously preventing the gear 73 from rotating along a second direction so that the fastening member 40 can be maintained at the selected tension during operating conditions.

Referring to FIG. 4, the gear 73 further includes a hand-operable tightening member 77. Such a gear 73 has a plurality of intersecting bores 78 formed therein for receiving the tightening member 77 so that an operator can advantageously manually adjust the tension without requiring the employment of the air cylinder 54.

Figure 7:
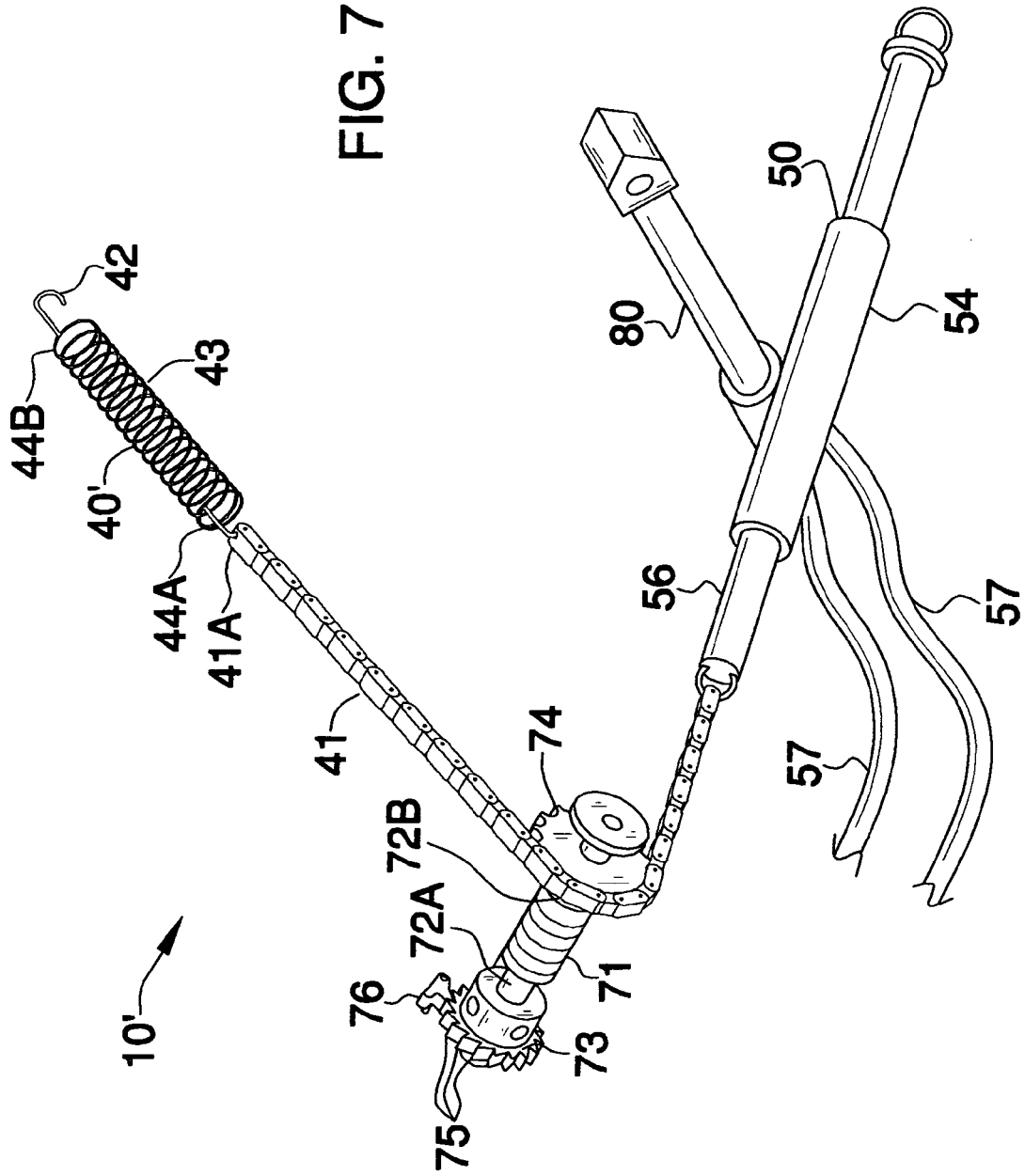
FIG. 7 is an enlarged perspective view of the device shown in FIG. 5

Referring to FIG. 7, in an alternate embodiment 10' the fastening member 40' consists of a resilient spring member 43 that has axially opposed end portions 44A and 44B. One such end portion 44A is directly attached, with no intervening elements, to one end portion 41A of the linked chain 41. Such a resilient spring member 43 includes a hook 42' directly connected, with no intervening elements, to another end portion 44B thereof for attaching the fastening member 40' to a rail 32. The spring member 43 advantageously provides a buffer for gradually pulling and releasing the cargo during operating conditions so that a tension force exerted under normal operating conditions can be dissipated and linearly waned to an acceptable load.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and desired by Letters Patent of the United States is:

1. An adjustable latching device for tying down a load carried on a flatbed truck, said device comprising:
   a plurality of elongated rails securable to selected portions of the truck, said rails being aligned along a substantially horizontal plane and extending parallel to each other;
   an elongated fastening member extendable along a top portion of the load for traversing and laterally spanning across a width of the truck so that the load can be maintained at a substantially stable position during operating conditions; and
   means for selectively tightening said fastening member such that tension of said fastening member is adjustable from a remote location;
   wherein said fastening member has opposed end portions operably connected to said tightening means and removably attachable to an opposed side of the truck respectively;
   wherein said tightening means comprises
      a control panel electrically coupled to said tightening means, said control panel including a user interface having a plurality of buttons for toggling said device between selected operating modes,
      an air cylinder having a piston adaptable between retracted and extended positions, said cylinder including a pair of conduits operably connected thereto and to an air supply source for selectively channeling air having a predetermined pressure level to and from said cylinder respectively, said cylinder being slidably attachable to one said rails and movable therealong, said conduits being provided with a pair of quick-disconnect couplings for retrofitting said device to alternate air supply sources,
      a bracket slidably attachable to another said rails and positionable laterally of said one rail adjacent a bed of the truck,
      a spool having opposed end portions connected to said bracket and aligned along the horizontal plane,
      a gear operably attached to one said spool end portion, and
      a sprocket operably attached to another said spool end portion;
   wherein said gear and said sprocket are axially rotatable about said spool along a selected direction and in sync, said fastening member being operably connected to said sprocket and having a tension that can be selectively adjusted.

2. The device of claim 1, wherein said gear comprises:
   an outer surface having a plurality of teeth offset therefrom and extending along a selected radial path; and
   a locking tab pivotally connected to said bracket for selectively engaging said teeth as said gear rotates about a first direction, said locking tab generating a resistive force for preventing said gear from rotating along a second direction so that the fastening member can be maintained at the selected tension during operating conditions.

3. The device of claim 2, wherein said gear further comprises:
   a hand-operable tightening member, said gear having a plurality of intersecting bores formed therein and for receiving said tightening member so that the tension is manually adjustable without requiring the employment of said air cylinder.

4. The device of claim 1, wherein said fastening member comprises: a linked chain provided with a hook attached thereto so that said chain is readily securable to the truck.

5. An adjustable latching device for tying down a load carried on a flatbed truck, said device comprising:
   a plurality of elongated rails securable to selected portions of the truck, said rails being aligned along a substantially horizontal plane and extending parallel to each other;
   an elongated fastening member extendable along a top portion of the load for traversing and laterally spanning across a width of the truck so that the load can be maintained at a substantially stable position during operating conditions;
   means for selectively tightening said fastening member such that a tension of said fastening member is adjustable from a remote location; and
   an elongated and rigid bar connected to said tightening means for assisting to maintain said fastening member at the stable position;
   wherein said fastening member has opposed end portions operably connected to said tightening means and removably attachable to an opposed side of the truck respectively;
   wherein said tightening means comprises
      a control panel electrically coupled to said tightening means, said control panel including a user interface having a plurality of buttons for toggling said device between selected operating modes,
      an air cylinder having a piston adaptable between retracted and extended positions, said cylinder including a pair of conduits operably connected thereto and to an air supply source for selectively channeling air having a predetermined pressure level to and from said cylinder respectively, said cylinder being slidably attachable to one said rails and movable therealong, said conduits being provided with a pair of quick-disconnect couplings for retrofitting said device to alternate air supply sources,
      a bracket slidably attachable to another said rails and positionable laterally of said one rail adjacent a bed of the truck,
      a spool having opposed end portions connected to said bracket and aligned along the horizontal plane, a gear operably attached to one said spool end portion, and a sprocket operably attached to another said spool end portion;

wherein said gear and said sprocket are axially rotatable about said spool along a selected direction and in sync, said fastening member being operably connected to said sprocket and having a tension that can be selectively adjusted.

6. The device of claim 5, wherein said gear comprises:

an outer surface having a plurality of teeth offset therefrom and extending along a selected radial path; and a locking tab pivotally connected to said bracket for selectively engaging said teeth as said gear rotates about a first direction, said locking tab generating a resistive force for preventing said gear from rotating along a second direction so that the fastening member can be maintained at the selected tension during operating conditions.

7. The device of claim 6, wherein said gear further comprises:

a hand-operable tightening member, said gear having a plurality of intersecting bores formed therein and for receiving said tightening member so that the tension is manually adjustable without requiring the employment of said air cylinder.

8. The device of claim 5, wherein said fastening member comprises a linked chain provided with a hook attached thereto so that said chain is readily securable to the truck.

9. An adjustable latching device for tying down a load carried on a flatbed truck, said device comprising:

a plurality of elongated rails securable to selected portions of the truck, said rails being aligned along a substantially horizontal plane and extending parallel to each other, each said rail being provided with a slot extending along a length thereof;

an elongated and flexible fastening member extendable along a top portion of the load for traversing and laterally spanning across a width of the truck so that the load can be maintained at a substantially stable position during operating conditions;

means for selectively tightening said fastening member such that may a tension of said fastening member is adjustable from a remote location; and an elongated and rigid bar connected to said tightening means for assisting to maintain said fastening member at the stable position;

wherein said fastening member has opposed end portions operably connected to said tightening means and removably attachable to an opposed side of the truck respectively;

wherein said tightening means comprises a control panel electrically coupled to said tightening means, said control panel including a user interface having a plurality of buttons for toggling said device between selected operating modes, an air cylinder having a piston adaptable between retracted and extended positions, said cylinder including a pair of conduits operably connected thereto and to an air supply source for selectively channeling air having a predetermined pressure level to and from said cylinder respectively, said cylinder being slidably attachable to one said rails and movable therealong, said conduits being provided with a pair of quick-disconnect couplings for retrofitting said device to alternate air supply sources, a bracket slidably attachable to another said rails and positionable laterally of said one rail adjacent a bed of the truck, a spool having opposed end portions connected to said bracket and aligned along the horizontal plane, a gear operably attached to one said spool end portion, and a sprocket operably attached to another said spool end portion, wherein said gear and said sprocket are axially rotatable about said spool along a selected direction and in sync, said fastening member being operably connected to said sprocket and having a tension that can be selectively adjusted.

10. The device of claim 9, wherein said gear comprises:

an outer surface having a plurality of teeth offset therefrom and extending along a selected radial path; and a locking tab pivotally connected to said bracket for selectively engaging said teeth as said gear rotates about a first direction, said locking tab generating a resistive force for preventing said gear from rotating along a second direction so that the fastening member can be maintained at the selected tension during operating conditions.

11. The device of claim 10, wherein said gear further comprises:

a hand-operable tightening member, said gear having a plurality of intersecting bores formed therein and for receiving said tightening member so that the tension is manually adjustable without requiring the employment of said air cylinder.

12. The device of claim 11, wherein said fastening member comprises: a linked chain provided with a hook attached thereto so that said chain is readily securable to the truck.

* * * * *